United States Patent [19]

Babchuk et al.

[11] Patent Number: 5,179,801
[45] Date of Patent: Jan. 19, 1993

[54] PORTABLE CATTLE GATE

[76] Inventors: Victor E. Babchuk, Box 53, Senlac, Saskatchewan, Canada, S0L 2Y0; Gordon R. Brown, Box 1, Senlac, Saskatchewan, Canada, S0L 2Y0

[21] Appl. No.: 725,328

[22] Filed: Jul. 5, 1991

[51] Int. Cl.⁵ .............................................. E06B 9/52
[52] U.S. Cl. .......................................... 49/58; 49/131; 256/14
[58] Field of Search ............... 49/49, 58, 131; 256/14, 256/15, 17

[56] References Cited

U.S. PATENT DOCUMENTS

| | | |
|---|---|---|
| 33,660 | 1/1890 | Edmondson . |
| 2,744,728 | 5/1956 | Melchert et al. ...................... 256/14 |
| 2,962,132 | 11/1960 | Reinhardt ........................ 160/351 X |
| 3,256,637 | 6/1966 | Torzey ............................. 49/131 X |
| 3,293,800 | 12/1966 | Martinmaas . |
| 3,435,909 | 4/1969 | Wenger et al. ................. 160/351 X |
| 3,491,480 | 1/1970 | Nickel et al. . |
| 3,491,482 | 1/1970 | Wedekind ............................. 49/131 |
| 3,623,267 | 11/1971 | Williams ............................. 49/131 |
| 3,744,185 | 7/1973 | Patterson ............................. 49/131 |
| 3,895,460 | 7/1975 | Lubmann . |
| 4,006,714 | 2/1977 | Goossen . |
| 4,844,423 | 7/1989 | Combs ............................. 256/14 X |

FOREIGN PATENT DOCUMENTS

| | | | |
|---|---|---|---|
| 29773 | 10/1930 | Australia .............................. 49/131 |
| 233860 | 12/1959 | Australia .............................. 49/131 |
| 768750 | 10/1967 | Canada . |
| 1067356 | 12/1979 | Canada . |
| 2114193A | 1/1983 | United Kingdom . |

Primary Examiner—Renee S. Luebke
Assistant Examiner—Jerry Redman
Attorney, Agent, or Firm—Adrian D. Battison; Stanley G. Ade; Murray E. Thirft

[57] ABSTRACT

A cattle gate has a base frame adapted to rest on a ground surface. Upright end frames are secured to the base frame at opposite ends and suspend a grid over the center of the base frame using a spring and chain suspension. The gate is a unitary structure that can be transported either using a truck or by attaching a pair of wheels and a hitch for towing purposes.

5 Claims, 3 Drawing Sheets

PORTABLE CATTLE GATE

The present invention relates to cattle gates and more particularly to a portable cattle gate.

Various types of cattle gate have been proposed in past. These are intended to allow the passage of vehicles through the gate, while preventing the passage of cattle or other animals.

Known cattle gates often use pits across a roadway bridged by a grating on which a hoofed animal can not walk. It has also been proposed, for example in U.S. Pat. No. 3,491,480 (Nickel) published in January 1970 and in British Application 2114193 (Pope) published August 1983, to employ similar gratings resiliently suspended from two ground anchored posts on opposite side of the gate.

In the prior art systems, the gates are expensive, either to install or to manufacture. They are premanently installed so that they are not conveniently used for temporary or seasonal vehicle access.

The present invention is concerned with the provision of a cattle gate that eliminates or ameliorates the deficiencies of the prior art.

According to the present invention there is provided a cattle gate comprising, a base frame adapted to rest on a ground surface;

upright members secured to opposite ends of the frame;

a grating extending between the upright members; and resilient suspension means connected to the upright member and the grating and suspending the grating above the frame.

The gate therefore constitutes a unit that can be simply handled and transported. In some embodiments the base frame can be equipped with wheels and a hitch to be transported as a trailer. It can be placed down whenever it is required and whether for long or short term use. There is no need to dig pits or post holes or to provide concrete anchors for any component of the gate.

In the accompanying drawings, which illustrate an exemplary embodiment of the present invention, FIG. 1 is an isometric representation of a gate according to the present invention;

Figure 1:
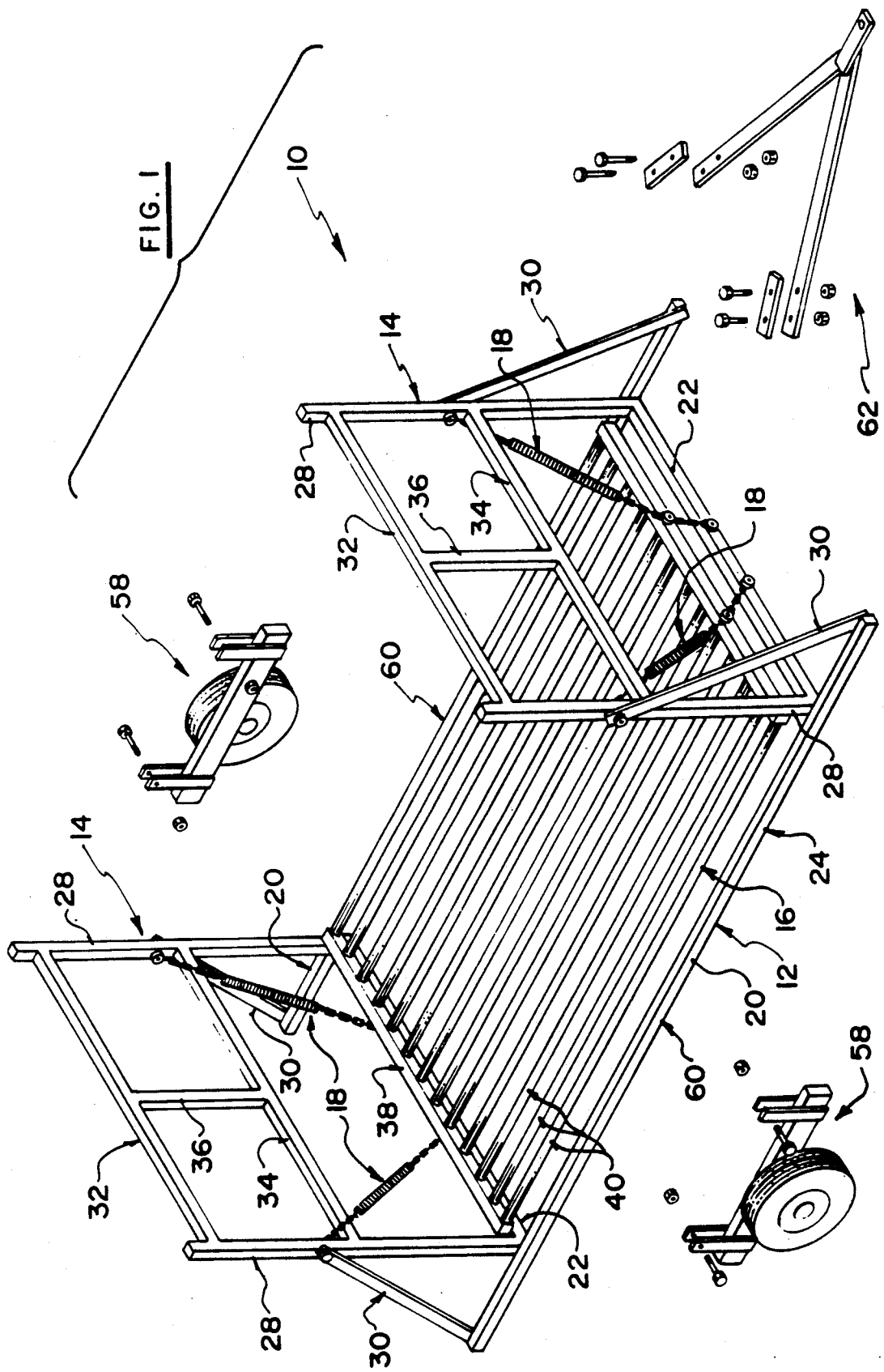
Figure 2:
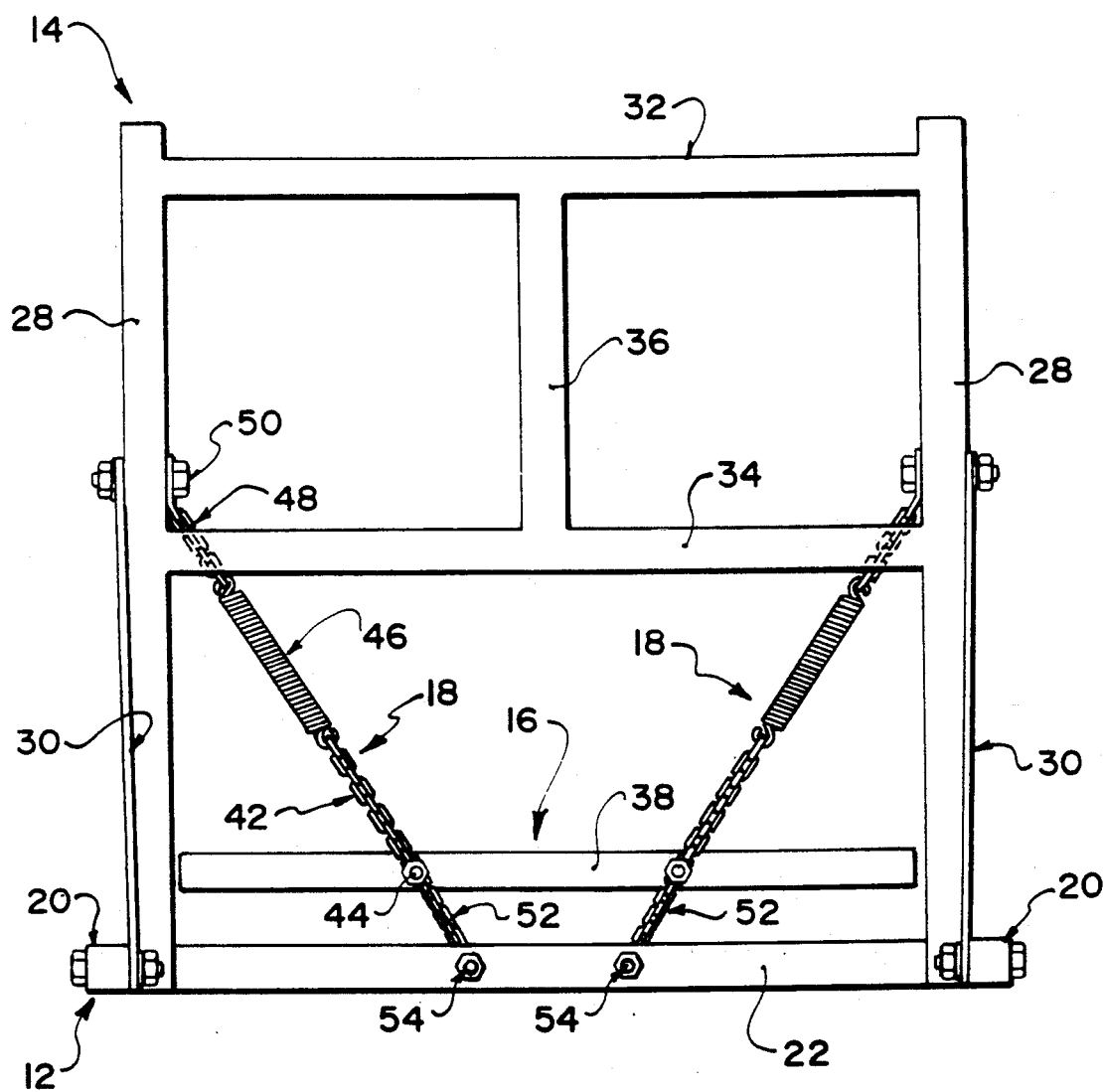
FIG. 2 is an end elevation of the gate.
Figure 3:
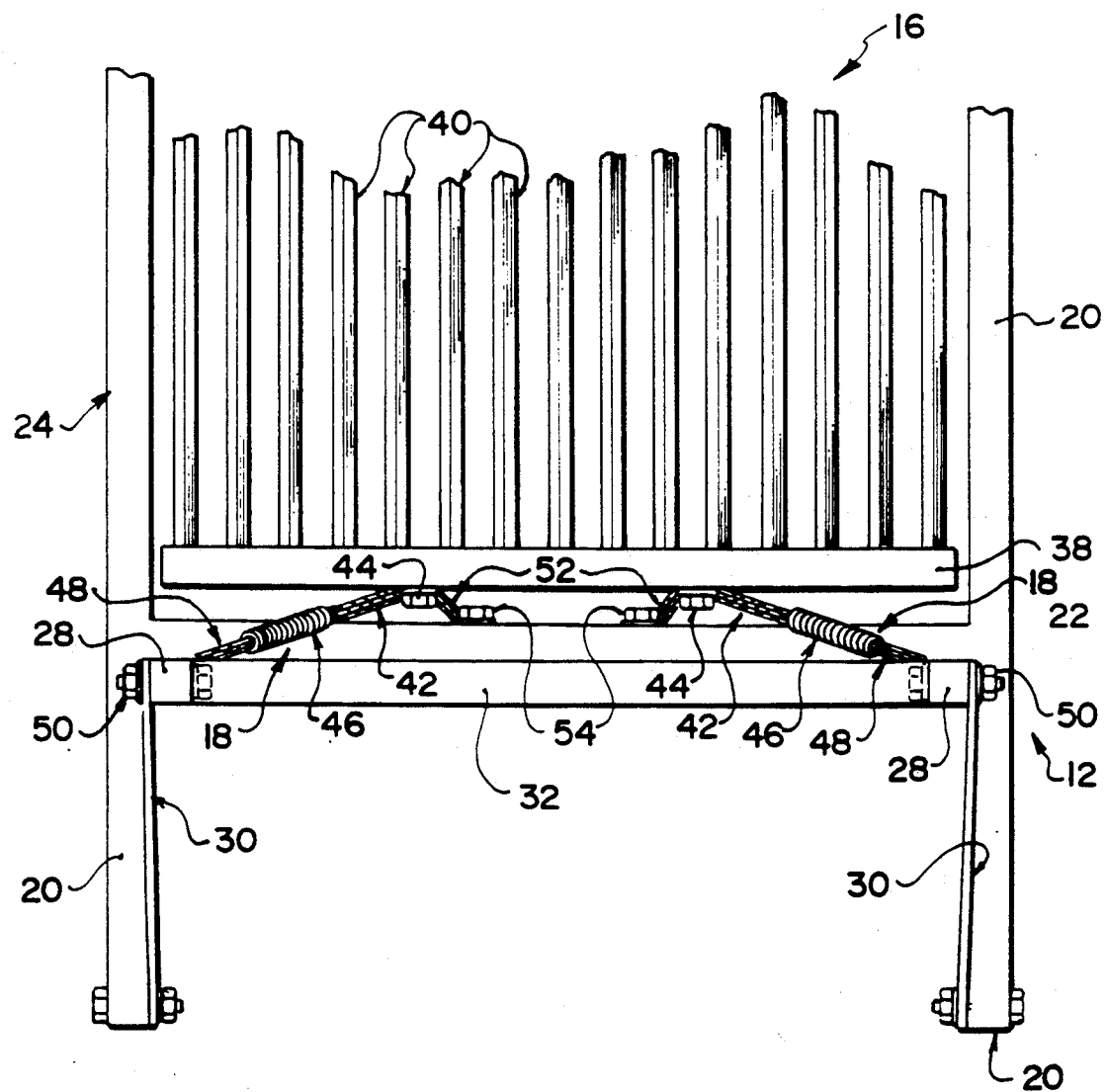
FIG. 3 is a partial plan view showing one end of the gate.

Referring to the accompanying drawings, there is illustrated a cattle gate 10 that is constructed on a ground supported base frame 12. Two upstanding end frames 14 are carried by the base frame at its opposite ends to form the sides of the gate. A grating 16 is suspended from the end frames by resilient hangers 18.

The base frame 12 includes two spaced, parallel bars 20 that extend from end to end of the gate. These are joined by two end bars 22 spaced inwardly from the ends of the bars 20 to provide a rectangular frame 24, with the ends of the bars 20 extending beyond the ends of the frame.

Each of the end frames 14 constitutes two uprights 28 projecting upwardly from the base frame at the respective junctions of the end bar 22 and the bars 20. Each of the upright is connected to the outer end of the adjacent bar 20 by a brace 30. The two uprights of the end frame are joined by two cross members 32 and 34 that are joined by a vertical centre strut 36.

The grating 16 is composed of two end bars 38 positioned adjacent the end bars 22 of the base frame and a series of grid bars 40 that link the end bars 38. The grid bars are parallel and spaced apart. They are of square cross section and oriented with one edge of each bar upwards. The grating 16 is slightly smaller than the base frame 12, so that the grating will rest on the ground in the centre of the base frame 12 when driven over by a vehicle.

Each of the hangers 18 consists of a chain 42 connected to the adjacent grating end bar 38 by a bolt 44. The chain is connected to a coil spring 46 that is in turn connected to a chain 48 secured to the adjacent upright 28 by a bolt 50. The two hangers 18 associated with each end frame 14 slope downwardly and towards one another so as normally to retain the grating 16 in a centered position.

To prevent unwanted displacements of the grating with respect to the base frame 12, each of the chains 42 has an end section 52 is connected to the base frame by a bolt 54.

The gate as thus described is a complete unit that can be picked up and transported as such. It may be placed down at any desired location to function as a cattle gate.

In use, the grating is suspended just above the ground, effectively preventing cattle from crossing the gate. When a vehicle approaches, the wheels press the grating down onto the ground, allowing the vehicle to pass unimpeded. When the vehicle passes, the springs 46 pull the grating back up to its gate position. The lateral chain tethers 52 ensure that the grating is not displaced beyond the base frame 12 by engagement with a vehicle tire. The resilient suspension of the grating ensures that it is not bent by vehicles and provides an extra deterrent to livestock.

Where desired, the gate can be equipped as a trailer so that it can be towed. A transportation kit for the gate includes a pair of wheels 58 to be mounted on the base frame at points 60 and hitch 62 bolted into the frame 12 at either end.

While one embodiment of the present invention has been described in the foregoing, it is to be understood that other embodiments are possible within the scope of the invention. The invention is to be considered limited solely by the scope of the appended claims.

We claim:

1. A cattle gate comprising,
    a rectangular grating formed by a plurality of elongate parallel rigid grating bars and two transverse end beams each rigidly connected to the bars at right angles thereto to a respective end of each of the bars;
    a rectangular base frame adapted to rest upon a ground surface and comprising a first rigid transverse beam member at a first end of the base frame, a second rigid transverse beam member at a second end of the base frame, a first rigid frame element rigidly connected to said rigid transverse beam members, a second rigidly frame element parallel to the first frame element and rigidly connected to said rigid transverse beam members, the first and second frame elements lying parallel to the grating bars and being separate therefrom to allow vertical movement of the grating relative to the frame element, the base frame surrounding the grating such that the grating can lie on the ground surface wholly within the base frame;

a first and a second upright member each connected to a respective one of the rigid transverse beam members, reinforcing means connecting said upright members and said frame for providing reinforcement to maintain the upright member in upright orientation such that the upright member is wholly supported by the frame and;

first and second resilient suspension means each connected between a respective one of the upright members and the grating and arranged to support at least a part of the grating spaced from the ground, the suspension means being resiliently deformable to allow the grating to be pushed to the ground within said base frame under weight from a vehicle.

2. A cattle gate according to claim 1 wherein each upright member includes an upright beam and wherein said reinforcing means comprises a brace member extending from the upright beam downwardly and away from the grating, the brace member being connected to an extension portion of the base frame.

3. A cattle gate according to claim 1 wherein the resilient suspension means comprises a flexible inextensible element coupled from said base frame to said grating and from said grating to one end of a spring, an opposite end of the spring being connected to said upright member.

4. A cattle gate comprising, a rectangular grating formed by a plurality of elongate parallel rigid grating bars and two transverse end beams each rigidly connected to the bars at right angles thereto to a respective end of each of the bars;

a rectangular base frame adapted to rest upon a ground surface and comprising a first rigid transverse beam member at a first end of the base frame, a second rigid transverse beam member at a second end of the base frame, a first rigid frame element rigidly connected to said rigid transverse beam members, a second rigid frame element parallel to the first frame element and rigidly connected to said rigid transverse beam members, the first and second frame elements lying parallel to the grating bars and being separate therefrom to allow vertical movement of the grating relative to the frame element, the base frame surrounding the grating such that the grating can lie on the ground surface wholly within the base frame;

a first and a second upright member each connected to a respective one of the rigid transverse beam members;

first and second resilient suspension means each connected between a respective one of the upright members and the grating and arranged to support at least a part of the grating spaced from the ground, the suspension means being resiliently deformable to allow the grating to be pushed to the ground within said base frame under weight from a vehicle;

at least one of the frame elements including extension portions thereof extending outwardly beyond each of the rigid transverse beam members, and first and second brace means each extending from a respective one of the upright members to a respective one of the extension portions such that the upright members are wholly supported by the frame.

5. A cattle gate comprising, a rectangular grating formed by a plurality of elongate parallel rigid grating bars and two transverse end beams each rigidly connected to the bars at right angles thereto to a respective end of each of the bars;

a rectangular base frame adapted to rest upon a ground surface and comprising a first rigid transverse beam member at a first end of the base frame, a second rigid transverse beam member at a second end of the base frame, a first rigid frame element rigidly connected to said rigid transverse beam members, a second rigid frame element parallel to the first frame element and rigidly connected to said rigid transverse beam members, the first and second frame elements lying parallel to the grating bars and being separate therefrom to allow vertical movement of the grating relative to the frame element, the base frame surrounding the grating such that the grating can lie on the ground surface wholly within the base frame;

a first and a second upright member each connected to a respective one of the beam members;

first and second resilient suspension means each connected between a respective one of the upright members and the grating and arranged to support at least a part of the grating spaced from the ground, the suspension means being resiliently deformable to allow the grating to be pushed to the ground within said base frame under weight from a vehicle;

at least one of the frame elements including extension portions thereof extending outwardly beyond each of the rigid transverse beam members, and first and second brace means each extending from a respective one of the upright members to a respective one of the extension portions such that the upright members are wholly supported by the frame;

a hitch connected to one of the rigid transverse beam members for pulling of the base frame in a direction longitudinally of the frame elements and two ground wheel assemblies, each attached to a respective one of the frame elements for support thereof.

* * * * *

UNITED STATES PATENT AND TRADEMARK OFFICE
CERTIFICATE OF CORRECTION

PATENT NO. : 5,179,801
DATED : January 19, 1993
INVENTOR(S) : VICTOR E. BABCHUK and GORDON R. BROWN It is certified that error appears in the above-identified patent and that said Letters Patent is hereby corrected as shown below:

On the title page
Priority claim from Canadian patent application 2,032,533 filed December 18, 1990.

Signed and Sealed this

Twenty-third Day of November, 1993

Attest:

BRUCE LEHMAN

Attesting Officer

Commissioner of Patents and Trademarks